United States Patent Office 3,175,069
Patented Mar. 23, 1965

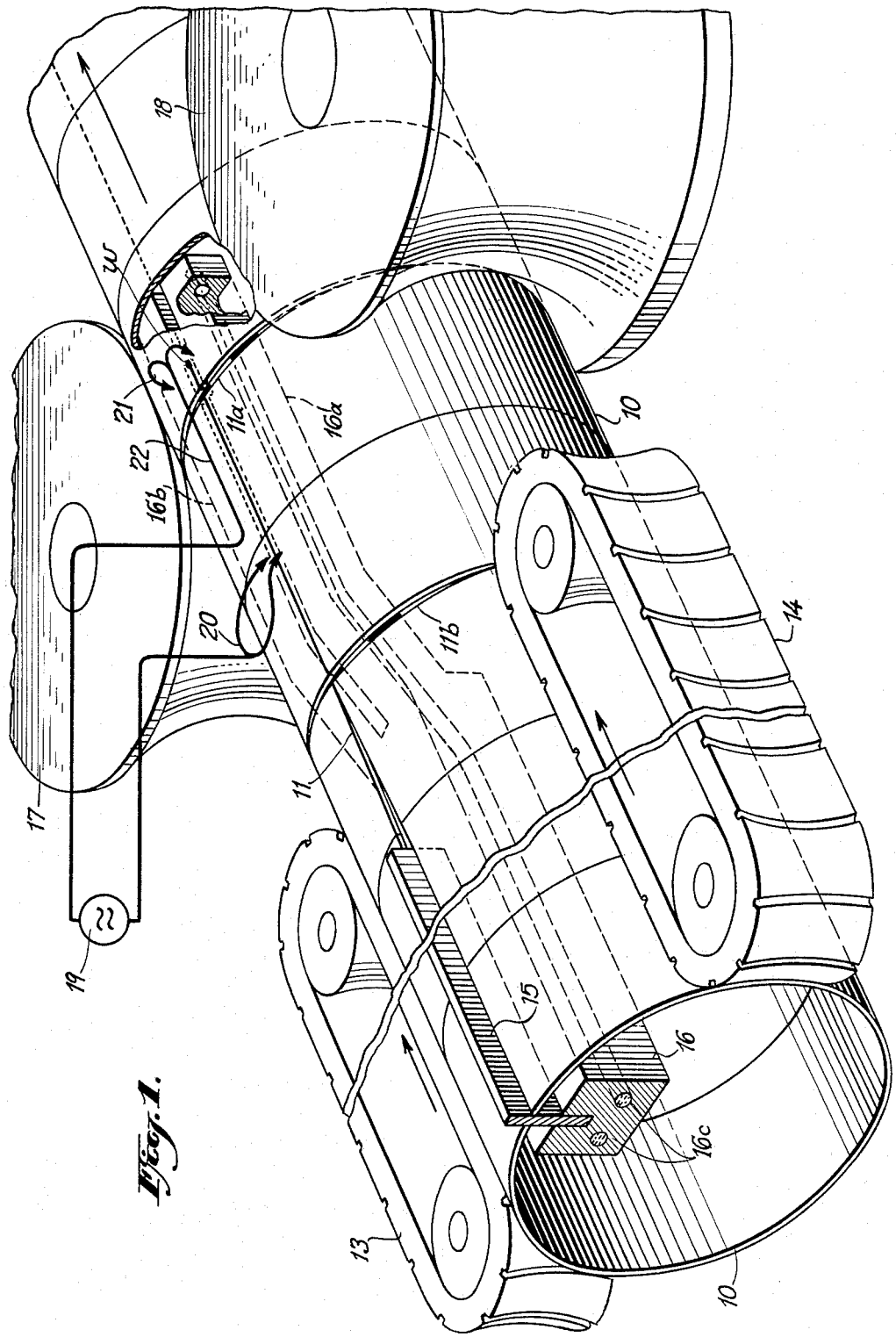

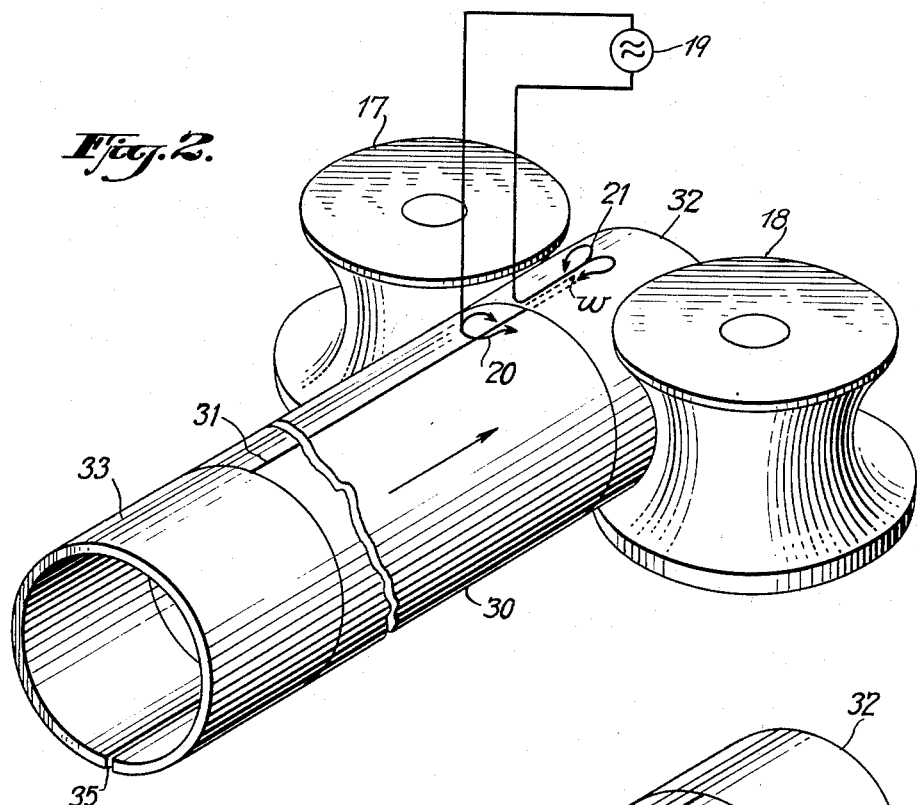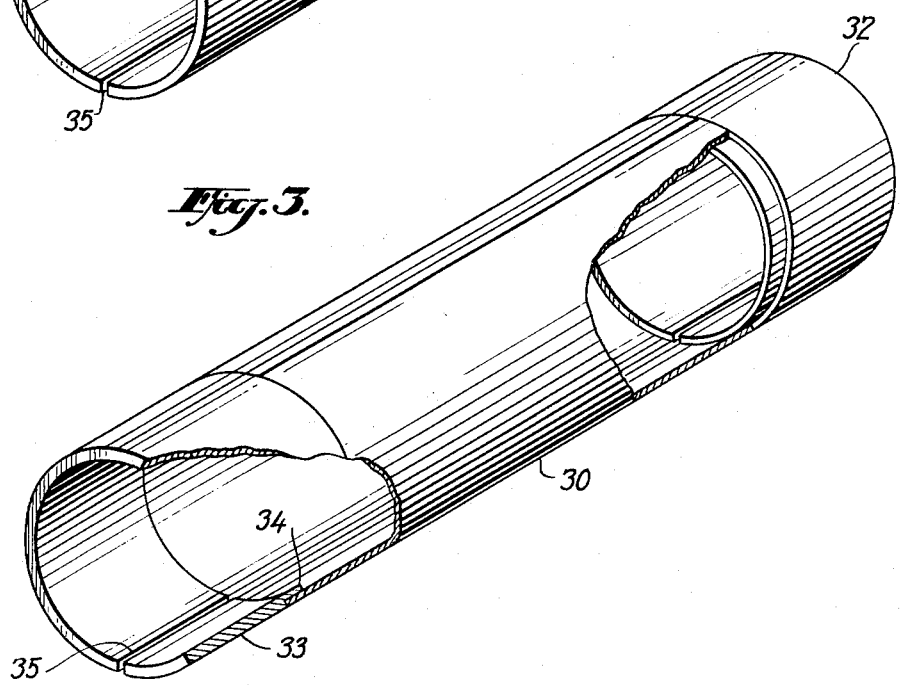

3,175,069
WELDING METAL ELEMENTS OF FINITE LENGTH BY HIGH FREQUENCY RESISTANCE HEATING
Fred Kohler, New York, and Wallace C. Rudd, Larchmont, N.Y., assignors to American Machine & Foundry Company, New York, N.Y., a corporation of New Jersey
Filed Apr. 24, 1963, Ser. No. 275,316
5 Claims. (Cl. 219—59)

This invention relates to the welding together of the opposed edges of pairs of metal portions or elements of finite length by the use of high frequency electrical heating current for heating such edges up to welding temperature upon their approach to a weld point, at which point the metal portions are welded together under pressure to provide a seam which is welded throughout from a point substantially at the forward end thereof and substantially to the trailing end thereof.

This application comprises a continuation-in-part of application Serial No. 177,855, filed March 6, 1962, now abandoned.

The invention is particularly adapted for forming a welded seam between the opposed edges of pairs of metal portions which form the edges at a gap (which may be closed or more or less open) in finite length tubular members such as cylinders or other tubular articles such for example as used for forming fluid tanks or generally annular members which are in a sense tubular such as wheel rims, hoops and the like, and which initially have a gap, either closed or open, and the edges of which are to be welded together. The invention may also be used to weld together elements such as strip-like portions of metal elements of short or finite length which do not necesarily form a part of a length of tubing, or of a rim, hoop or the like.

United States Patent to Rudd et al. No. 2,857,503, granted October 21, 1958, reference to which is hereby made, relates to a method for longitudinally welding a seam line in advancing tubing, strips or other forms of workpieces, by the use of high frequency electrical current applied by contacts connected to a source or current and engaging at the seam line on the advancing workpieces, one of the contacts being located in advance of the other and the circuit to the contacts including a portion extending along from one of the contacts toward the other and in spaced relation to the seam line for effectively concentrating close to the seam line, the high frequency current flowing along on the path of the seam line from one contact to the other. As the workpieces pass the second of the two contacts, the edges at the seam line which are to be welded together, are held in firm contact under pressure and become there welded at a weld point. This method provides in some instances a highly desirable and efficient way for welding a seam line along a gap in the workpiece, which may, if desired, be an initially closed or substantially closed gap, and in such a way as to produce a weld at which the metal along the outermost or uppermost portion of the seam line, is softened over a somewhat wider region than along the underside of the seam line. As a consequence, for example in the welding of tubing, the greater part of the upset or flash of the metal along the weld line occurs on the outside or upper side, rather than on the inside of the tubing. The particular form of the apparatus disclosed in said patent is adapted for longitudinally welding workpieces generally of relatively extensive lengths and such that it is relatively unimportant that the welded seam does not start to form at the very forward end of the workpiece or extend to the very trailing end thereof. The present invention involves the use of features of said patent as improved, adapted and supplemented particularly for the welding of seams of finite length throughout from substantially the forward ends to the trailing ends thereof, thereby enabling the invention to be utilized for welding the gaps or interruptions not only in short tubing, but also in elements such as wheel rims or hoops and the like, all of which, for convenience, may be sometimes referred to herein as "tubular members of finite length." The invention is also particularly adapted for welding a more or less continuing series of such members, as well as individual members of such a nature.

In accordance with the present invention in its preferred form, a series of the annular workpieces is rapidly advanced with the pieces in coaxial relationship and with each one applying pressure to the previous one and, while the gaps are maintained in alignment, the series is advanced between a pair of pressure rollers located at opposite sides of the region of the weld point. High frequency current is applied to the gap edges at the seam line by a first contact means located substantially in advance of the weld point and a second contact means located at the region of the weld point, the current to one or the other of such contact means being conducted along a "proximity conductor portion" extending along close to the seam line from one of the contact means close to the other, thereby causing the current flowing along the seam to be closely concentrated by reason of mutual inductance. Usually the gaps for a substantial distance in advance of the weld point are closed, although back at other points the gaps may be held open by a seam guide which serves to maintain the gaps in proper alignment. Means at either side of such seam guide, preferably in the form of Caterpillar-like belt arrangements, are provided (although other suitable means may be used) for crowding the succeeding workpiece members forwardly while causing the gap edges thereon to press against the seam guide and subsequently against each other to close the gaps.

In this way, each one of the workpiece members, as it is passing the weld point, serves to provide a current path, along the desired seam line for conducting the high frequency current back to the forward edge of the seam line in the next succeding workpiece, so that the edges of the gap on the latter will start to become heated at the proper time, whereby when such forward ends of the edges reach the weld point, same will have reached welding temperature. Also, as the trailing ends of the gap edges in each particular workpiece pass the first contact means, then the forward ends of the edges of the succeeding workpiece will engage such first contact means and act to continue to maintain a current path to the trailing end edges of the preceding workpiece and trailing ends of the latter, thereby insuring that the latter will continue to be heated until same reach the weld point and thus permit welding of the seam in each workpiece throughout its length.

In an alternative embodiment of the invention, adapted for the welding of single workpieces in lieu of a series thereof, each workpiece may be provided at its forward end and at its trailing end with supplemental current carrying elements, which, in case the workpieces are tubing, comprise ring-like members which engage respectively the forward and rear ends of each workpiece as same is advanced between the squeeze rollers at the weld point, thereby providing paths to conduct the high frequency current onto the forward end of the desired seam line and for continuing to conduct the current onto the trailing end of the seam line for the necessary time to permit the heating and welding of the entire length of the seam of the workpiece.

It will be understood that in the event strip-like portions of finite length or members other than of tubular form are to be welded, then the guiding, supporting and advancing means therefor will be properly modified in shape and design to accommodate such other types of workpieces.

In some cases, it may be desirable preliminarily to heat the workpieces or the gap edges thereof which are to be welded, up to a temperature for example to near the Curie point of the metal, in case the workpieces are of magnetic material, or even to a higher temperature. Thus, when the workpieces arrive at the region where the high frequency current is finally to be applied as above described, the gap edges will need to be heated only by the further necessary amount to bring the edge surfaces to plastic weldable condition. In this way, the operation may be carried on more rapidly and with less of the final heat dissipated away from the seam line and consequently with a narrower band of heating to the welding temperature, making possible less upset of the metal and with a lesser proportion of the metal becoming "cast" in forming the seam. Such preliminary heating may be accomplished by the use of furnace means or preferably by known forms of induction heating arrangements arranged either externally or internally of the tubing or both, along the seam line, certain examples of such induction heating being disclosed in the United States patent to Rudd No. 2,938,993, granted May 31, 1960.

In some cases, either intentionally or due to manufacturing irregularities, the succeeding workpieces to be welded may be of inaccurate or irregular dimensions such that the trailing edges of one workpiece do not come into contacting engagement with the forward edge portions of the next succeeding workpiece at the region along the line at which the welded seams are to occur. For example, in case a succession of wheel rims is to be welded, these may have been made with rather wide tolerances as to their dimensions and thus when such workpieces are advanced one following the other, there may be gaps therebetween at the region of the desired seam line, or the parts may be such that the trailing end edge portions of one may contact the forward end edge portions of the next only at one or more widely separated points, leaving an annular or arcuate gap between the workpieces across which the high frequency current cannot pass directly from the seam line of one workpiece to the end of the seam line on the next, but instead the current would have to travel circumferentially part way around the workpieces before reaching a point where same may pass from one workpiece to the next. This would involve an unnecessary waste of heat for heating portions of the workpiece other than where the seam lines are desired, and also possibly causing undesired softening of the metal at undesired points and further, also possibly irregularly interfering with the preferred impedance conditions in the high frequency current circuit or with the proper heating of the very end portions of the gap edges. In order to avoid such difficulties, in accordance with another aspect of the invention, a bar-like elongated contact is mounted to extend along in engagement with the interior surfaces of the succeeding workpieces adjacent the desired seam line or preferably a pair of such contacts is provided, one at each side of the seam line within the interior of the workpieces. With such bar contacts, whenever the trailing end edge of one of the workpieces is separated from the forward end of the next by a gap, such gap will be in effect short-circuited, enabling the high frequency heating current to flow across such gaps and to insure heating of the entire length of the gap edges which are to be welded at the seam line without difficulty or interruptions. This feature of the invention may be utilized not only in cases where the high frequency current is applied by contact means of which one succeeds the other along the seam line as above described, but also this aspect of the invention may be used in cases where the gaps in the workpieces are still open prior to the weld point and the current is applied thereto by known means either inductively or by contacts located respectively at opposite sides of the gaps at points in advance of the weld point.

The use of such bar contacts internally of the workpieces is particularly advantageous inasmuch as, in that position, they will in no way afford any interference with the external pressure rollers at the weld point or elsewhere, or with the contacts or other means which may be used externally of the workpieces for applying the heating current thereto.

Various further and more specific objects, features and advantages of the invention will appear from the description given below, taken in connection with the accompanying drawings, illustrating by way of example a preferred form of the invention.

In the drawings:

FIG. 1 is a somewhat schematic diagram of a preferred form of the invention for welding a series of the short or finite length workpieces of tubular shape;

FIG. 2 is a perspective view schematically illustrating the principal features of an alternative embodiment of the invention for the welding of single workpieces of a tubular nature; and FIG. 3 is a perspective view of an assembly of one of the workpieces with its accompanying ring-like members at its forward and trailing ends as above referred to.

Referring to FIG. 1 in further detail, there is shown a succession of the short finite length tubular members as at 10, each with gaps as at 11, and being advanced with each one pressing forwardly against the next and axially in alignment, by the action, for example, of Caterpillar-like belt means as at 13, and 14 arranged along opposite sides of the series of workpieces.

The series of workpieces is thus crowded and advanced while the gaps therein are held in alignment as by a seam guide means 15 of insulation material suitably supported as by metal bracket means 16 carried by any suitable desired support extending rearwardly of the apparatus shown.

The weld point past which the workpieces are advanced is indicated at $w$ and at either side of such point, pressure rollers as at 17 and 18 are provided to insure that the gap edges at the weld point are held in the desired firm pressure for becoming welded together.

A suitable source of high frequency current 19 is provided with its terminals connected preferably to a first contact means as at 20 and a second contact means as at 21. The first contact means is located substantially in advance of the weld point and the second contact means as at 21 is located at or close to the region of the weld point. Each of such contact means may for example comprise one or a pair of spring-like contacts engaging the workpieces at or adjacent the desired seam line. A proximity conductor portion as at 22 extends along above the seam line for most of the region between the two contact means and serves to complete the circuit and to provide means by reason of mutual inductance for causing the current flowing along on the seam line to be maintained in fairly closely concentrated condition at the seam line and the edge portions closely adjacent thereto. However, the current will not be sharply concentrated on the very line of the desired seam but will heat a narrow band of the metal more widely on the upper surface, as compared with a quite narrow band further down in the depth of the metal or on the inner surface thereof. As a result, as the gap edges are pressed together at the weld point, more of the metal being softened on the upper side than at the underside of the tubing, the upset will tend to occur substantially exteriorly of the tubular members thus leaving the interior seam relatively free of upset metal as is usually desired in the case of tubing. It will be understood that the contacts 20, 21 and the high frequency connections thereto, should, in accordance with usual practice, be of a construction provided with suitable cooling fluid cavities.

The current used may be of a frequency of the order of 50,000 cycles per second or preferably higher and in the usual case for example as high as 300,000 to 500,000 cycles per second and with adequate power being supplied to insure that the edges will become heated to welding temperature at each point thereon at the moment such point reaches the weld point. Suitable drive means (not shown) are of course provided for the Caterpillar-like belt means or its equivalent and preferably the pressure rollers 17 and 18 are also driven, but it should be noted that the peripheral speed of the belt means at their areas of engagement with the workpieces should be somewhat greater than the peripheral speed of the pressure rollers at their areas of engagement with the workpieces in order to insure that the workpieces will be crowded into and through the nip of the pressure rollers with each workpiece firmly pressing against the adjacent ones.

The welded seam beyond the weld point will normally extend continuously throughout the seam line of each workpiece from the forward edge thereof to the trailing edge thereof and in view of the nature of the weld formed, the welded seam on each workpiece will normally extend integrally into that on the succeeding one, but subsequent to the weld point, each workpiece may be easily separated from the succeeding ones by breaking the welded seam at the points where same overlap the workpiece end edges.

Thus with the workpieces passing through the apparatus in series, once the equipment is put into operation, each workpiece as it is passing the weld point will serve to provide current paths for starting the heating of the edges of the next succeeding workpiece, and the next succeeding workpiece will provide a current path for maintaining the circuit on the first-mentioned workpiece, even after it has passed the first contact means 20.

In some cases, as above explained, the ends of the succeeding workpieces, as advanced through the apparatus, may not come into abutting contact at the region of the desired seam line. For example, as shown in FIG. 1, the adjacent ends of two of the workpieces may be irregular or so formed that same will be spaced apart as by a gap indicated at 11a, and in another instance, two of the workpieces, as shown, are separated as by a gap at 11b. Thus, unless some special steps are taken, the current on leaving the seam line on one of these elements, will have to flow along such a gap to a point where the workpieces do come into abutment, thence back along the gap to the seam line with the consequent disadvantages hereinabove explained. In order to avoid such difficulties, conductor or contact means such as a metal bar 16a may be suitably mounted internally of the advancing workpieces, as shown by the dotted lines in FIG. 1, and in sliding engagement with the interior surfaces thereof, and so as to short-circuit any such gaps, thereby allowing the heating current to pass almost directly from the desired seam line on one workpiece to the seam line on the next. Preferably, such contact or conductor bar means are provided along both sides of the seam line, as shown at 16a and 16b. These contact bars may be supported internally of the workpieces by any suitable means. With the construction as shown, same are carried on or form extensions of the metal support 16 which carries the seam guide 15. These conductor bars should preferably be fluid-cooled, and for this purpose, fluid cooling cavities as indicated at 16c may be provided in the support 16 to extend on through the members 16a, 16b and arranged to discharge the cooling fluid either into the interior of the advancing workpieces, or the cavities may be so arranged as to circulate the fluid back to whatever supporting means is used for the member 16. As hereinbefore indicated, these conductor bars may be similarly used whether the gaps at the seam line are closed or open shortly prior to the weld point, or whether the high frequency current is applied to the gap edges by the particular contact arrangement shown in FIG. 1, or by other known means hereinabove referred to.

With the embodiment of the invention schematically illustrated in FIG. 2, the parts like or similar to those of FIG. 1 are identified by the same reference characters and here a single tubular workpiece as at 30 is provided, having a gap as at 31, which is shown in closed condition.

With this embodiment of the invention, individual members of finite length, as distinguished from a series thereof, may be welded with the form of seam above described and in which the greater part of the upset of the metal occurs upwardly, or outwardly in the case of tubing, leaving the under or inner surface relatively free of upset. Here as the individual workpiece as at 30 is to be welded, it is provided at its front end with a ring-like detachable element as at 32, and at its trailing end with a similar ring-like element as at 33. The member 30, together with the elements 32 and 33, may be advanced through the apparatus as by the use of Caterpillar-like belt means, as above disclosed in connection with FIG. 1, or other suitable means. And here the element 32, as it is advanced between the pressure rollers past the weld point w, fulfills a function similar to that which would be accomplished if another of the workpieces of finite length were in its place, so far as concerns providing paths for the current to the workpiece before the forward end of the workpiece arrives at the weld point. Similarly here the ring-like element 33 at the trailing end, fulfills a function similar to that which would be fulfilled by another workpiece of finite length if same were located in the same place and so far as concerns the problem of maintaining paths for the high frequency current flowing onto and along the seam line 30 after the trailing end edge of the workpiece has passed the weld point.

As best indicated in FIG. 3, the element 33 may be formed at its forward end with a flange-like portion 34, embraced by the trailing end edges of the member 30. Similarly, the forward element 32 may be provided with a flanged configuration at its trailing edge and embraced by the forward end edges of the workpiece 30. The flanged portions may engage the end edges of the workpiece with forced fits so that they may be readily removed from the workpiece after the latter has been welded along its seam line 31. One or both of the elements 32, 33 may be formed with slits as at 35, if desired, to add to the resiliency thereof, as same are fitted within the workpiece ends.

In the event the end edges of workpieces such as at 30 should be irregular at the seam line, then the internal flanges as at 34 will serve to conduct the current across any gaps which may occur because of such irregularities at the end edges adjacent the desired seam line.

It may be here noted that as the current paths shift from the end of element 32 during its advance through the apparatus, onto the workpiece 30, or partially thereon, and similarly as the current paths shift from the workpiece to the trailing element 33, the resistance of the path portions between the contact means along the seam line, will be varied, provided the elements 32, 33 are formed of metals different from that of the workpiece. That is, in the usual case the elements 32, 33 may be formed of metal or metals different from that of the workpiece and such that same will not become heated to welding temperature. For example, if the workpiece is of a magnetic metal, then the members 32, 33 might, for example, be of a non-magnetic metal of better conductivity such as copper or Phosphor bronze, so that the resistance heating effect would be less pronounced on these elements than on the workpiece, thus leaving these members free of fusion so that they may be used over again. Yet in order that such variations of resistance need not cause any undesirable variation in the degree of heating of the edges of the workpiece which are to be welded at the advancing and trailing ends of the latter, it is desirable that the circuit applying the high frequency current be so designed that, as much as reasonably possible of its total impedance (for example about 80% or more) will be constituted of reactance components, as distinguished from components having any very large ohmic resistance. The current flowing in the circuit is equal to the voltage across the source divided by the total impedance and accordingly if the circuit is designed as here suggested, such variations as occur in the ohmic resistance of the current paths along the edges which are to be welded, will have only a small or relatively negligible effect upon the total current and the resulting desired heating of the workpiece gap edges. If desired, the gaps of the elements 32, 33 may be located along the desired seam line and remain open as the assembly passes the weld point and hence same will be free of any chance of becoming welded together.

It will be understood that the arrangement as shown in FIG. 2, utilizing the ring-like elements as at 32, 33, may be used not only for the welding of a single workpiece as at 30, but also a series of several or more thereof placed end to end under pressure and fed through the apparatus by means such as in FIG. 1.

While reference herein has at various points been made to a "gap" or "gaps" in the workpieces where same are to be welded, it will be understood that the opposed edges of the gaps may be in contact, if desired, and for convenience the interruption along their lines of contact (the desired seam line) is nevertheless referred to as a "gap" or "gaps" whether open or closed.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for welding together throughout their effective lengths the edges of a gap in a tubular member of finite length comprising: means for feeding said member with its gap longitudinally passing a weld point while providing means assembled with said member in the form of other conductive elements preceding and succeeding same in alignment and in contact therewith; pressure rollers for engaging opposite sides of such assembly as same passes the weld point and for pressing such gap edges into welded relation; a first contact means for engaging such assembly at or adjacent the line of the desired welded seam and at a region substantially in advance of the weld point; a second contact means for engaging the assembly at or adjacent the line of the desired seam and at the region of the weld point; and a source of high frequency current connected to said contact means for providing parallel flows of current along said edges between such first and second contact means, such preceding conductive element in passing the weld point serving to provide paths for said current from the region of the weld point along the seam line and on the gap edges of said member to said first contact means before said member reaches the weld point, such succeeding conductive element serving to continue to maintain current paths from said first contact means along the seam line and on said edges of said gap after said member has passed said first contact means, the conductivity of at least one of said conductive elements being different from that of the tubular member being welded, and the total impedance of the circuit supplying the high frequency current being constituted principally of reactance components as distinguished from components of large ohmic resistance.

2. Method for welding together the edges of gaps in a succession of tubular members of finite length, such method comprising in combination the steps of: advancing a succession of said members past a weld point while same are in axial alignment and with the gaps thereof aligned, the trailing end edges of each member normally engaging in abutting relation the forward end edges of the succeeding member at the region of the desired seam line; applying high frequency current to flow along the desired seam line along the edges of said gaps for a substantial distance in advance of the weld point, such current being applied by first contact means located substantially in advance of the weld point and second contact means located at the region of the weld point, each of said members of finite length, in passing the weld point, normally serving to provide a path for said current the weld point along the seam line and on the gap edges of the next succeeding member to said first contact means, and each such next succeeding member normally serving to continue to maintain a current path from said first contact means along the desired seam line and on the member in advance thereof after the latter has passed the first contact means; and providing conductor means slidably engaged by the interior surfaces of said members along adjacent the seam line for maintaining paths for said current along the gap edges in cases where the trailing end edges of one of said members fail to contact the forward end edges of the next member at the region of the seam line.

3. Method for welding together the edges of gaps in a succession of tubular members of finite length, such method comprising in combination the steps of: advancing a succession of said members past a weld point while same are in axial alignment and with the gaps thereof aligned, the trailing end edges of each member normally engaging in abutting relation the forward end edges of the succeeding member at the region of the desired seam line; causing high frequency current to flow along the desired seam line along the edges of said gaps from the weld point to another point in advance of the weld point, each of said members of finite length in passing the weld point normally serving to provide a path for said current from the weld point along the seam line on the gap edges and on the gap edges of the next succeeding member to said other point, and each such next succeeding member normally serving to continue to maintain a current path from said other point along the desired seam line and on the member in advance thereof after the latter has passed said other point; and providing conductor means slidably engaged by the interior surfaces of said members along adjacent the seam line for maintaining paths for said current along the gap edges in cases where the trailing end edges of one of said members fail to contact the forward end edges of the next member at the region of the seam line.

4. Apparatus for welding together substantially throughout their effective lengths the edges of gaps in a succession of tubular members of finite length comprising: means for feeding a succession of said members in axial alignment and with the gaps therein aligned and with the trailing end edges of each member normally engaging in abutting relation to the forward end edges of the succeeding member at the region of the desired seam line; pressure rollers respectively for engaging opposite sides of the series of members as they pass a weld point and for pressing the gap edges into welded relation; a first contact means for engaging the members at or adjacent the desired seam line and at a region substantially in advance of the weld point; second contact means for engaging the members at or adjacent the seam line and at the region of the weld point; a source of high frequency current connected to said contact means for providing flows of current along said edges between said first and second contact means, each of said members of finite length, in passing the weld point, normally serving to provide a path for said current from the weld point along the seam line and on the gap edges of the next succeeding member to said first contact means, and each such next succeeding member normally serving to continue to maintain a current path from said first contact means along the desired seam line and on the member in advance thereof after the latter has passed the first contact means; and conductor means slidably engaged by the interior surfaces of said members along adjacent the seam line for maintaining paths for said current along the gap edges in cases where the trailing end edges of one of said members fail to contact the forward end edges of the next member at the region of the seam line.

5. Apparatus for welding together substantially throughout their effective lengths the edges of gaps in a succession of tubular members of finite length comprising: means for feeding a succession of said members in axial alignment and with the gaps therein aligned and with the trailing end edges of each member normally engaging in abutting relation to the forward end edges of the succeeding member at the region of the desired seam line; pressure rollers respectively for engaging opposite sides of the series of members as they pass a weld point and for pressing the gap edges into welded relation; means for applying high frequency current to flow along the desired seam line along the edges of said gaps from the weld point to another point in advance of the weld point, each of said members of finite length in passing the weld point normally serving to provide a path for said current from the weld point along the seam line on the gap edges and on the gap edges of the next succeeding member to said other point, and each such next succeeding member normally serving to continue to maintain a current path from said other point along the desired seam line and on the member in advance thereof after the latter has passed said other point; and conductor means mounted in a position slidably to be engaged by the interior surfaces of said members along the adjacent seam line for maintaining paths for said current along the gap edges in cases where the trailing end edges of one of said members fail to contact the forward end edges of the next member at the region of the seam line.

References Cited by the Examiner
UNITED STATES PATENTS

| Re. 25,183 | 6/62 | Rudd | 219—67 |
|---|---|---|---|
| 1,247,501 | 11/17 | Butcher | 219—59 |
| 2,857,503 | 10/58 | Rudd et al. | 219—59 |

RICHARD M. WOOD, *Primary Examiner.*

UNITED STATES PATENT OFFICE
CERTIFICATE OF CORRECTION

Patent No. 3,175,069 March 23, 1965

Fred Kohler et al.

It is hereby certified that error appears in the above numbered patent requiring correction and that the said Letters Patent should read as corrected below.

Column 8, line 7, after "current" insert -- from --; line 53 and column 9, line 11, strike out "to", each occurrence.

Signed and sealed this 3rd day of August 1965.

(SEAL)
Attest:

ERNEST W. SWIDER
Attesting Officer

EDWARD J. BRENNER
Commissioner of Patents